United States Patent [19]

Yasuhara

[11] 4,117,516

[45] Sep. 26, 1978

[54] DEFLECTION YOKE

[75] Inventor: Yukihiko Yasuhara, Kawasaki, Japan

[73] Assignee: Denki Onkyo Co., Ltd., Tokyo, Japan

[21] Appl. No.: 753,366

[22] Filed: Dec. 22, 1976

[30] Foreign Application Priority Data

Dec. 24, 1975 [JP] Japan ............................... 50-176169

[51] Int. Cl.$^2$ ............................................... H04M 5/64

[52] U.S. Cl. ...................................... 358/248; 335/210

[58] Field of Search ........................ 358/248, 242, 227; 335/210

[56] References Cited

U.S. PATENT DOCUMENTS

| | | | |
|---|---|---|---|
| 3,671,894 | 6/1972 | Sawada | 358/248 |
| 3,786,185 | 1/1974 | Shrader | 358/248 |

*Primary Examiner*—Robert L. Griffin

*Assistant Examiner*—Edward L. Coles

*Attorney, Agent, or Firm*—Armstrong, Nikaido, Marmelstein & Kubovcik

[57] ABSTRACT

A deflection yoke includes at least three positioning units mounted on one end of a coil separator having its other end secured against the neck of a cathode ray tube, the units permitting an adjustment in the orientation of the deflection yoke relative to the tube axis when fixedly mounting the yoke about the tube while maintaining it spaced from the tube wall. Each of the positioning unit comprises a support plate secured to the one end of the coil separator, and a threaded bolt adjustably and threadably engaging the support plate and having its free end held in abutment against the tube wall. Relative adjustment of the threaded bolts enables the axis of the deflection yoke to be disposed at a desired orientation with respect to the tube axis.

8 Claims, 4 Drawing Figures

DEFLECTION YOKE

BACKGROUND OF THE INVENTION

The invention relates to a deflection yoke adapted to be mounted on a cathode ray tube of a color television receiver, and in particular, to a deflection yoke having means for adjusting the orientation of the axis thereof.

A color television receiver generally employs a convergence yoke in order to achieve the convergence of three electron beams. Recently, in a cathode ray tube in which three electron beams are emitted by respective electron guns in a planar array, the use of a convergence ring is avoided while utilizing only the magnetic deflection field produced by a deflection yoke to achieve a good convergence over the entire screen. When using a deflection yoke so designed, a significant convergence error results if the axis of the central electron gun is aligned with the axis of the deflection yoke. It is known that the error can be considerably reduced by adjusting the orientation of the deflection yoke. Specifically, the rear end of the deflection yoke is secured to the neck while the front end thereof is moved in any desired directions including the vertical and horizontal directions to adjust the orientation of the axis of the deflection yoke relative to the tube axis. An example of an apparatus which permits such an adjustment is disclosed in U.S. Pat. No. 3,921,110 issued to H. Ishii et al. It is noted, however, that the disclosed apparatus utilizes a complex arrangement, resulting in a high cost of the resulting deflection yoke.

SUMMARY OF THE INVENTION

It is an object of the invention to provide a deflection yoke having a greatly simplified mechanism which adjusts the orientation thereof.

It is another object of the invention to provide a deflection yoke having positioning means which facilitate the adjustment and handling.

It is a further object of the invention to provide a deflection yoke which achieves the adjustment of purity and the compensation of convergence error simultaneously.

A feature of the invention resides in the fact that a plurality of positioning units are mounted substantially at an equal interval around the periphery of the front end of a coil separator which is interposed between a horizontal deflection coil and a vertical deflection coil of the deflection yoke. Each positioning unit comprises a support plate secured to the coil separator and a threaded bolt adjustably and threadably engaging the support plate. The rear end of the deflection yoke is secured to the neck of a cathode ray tube by tongues on the coil separator which are clamped against the neck by a clamping band in a conventional manner. In this manner, the axis of the deflection yoke is located relative to the axis of the centrally located electron gun of the tube. The axis of the deflection yoke can be adjusted relative to the tube axis by turning the bolts to advance into contact with the tube wall, thereby locating various segments of the front end of the yoke at adjusted spacings from the tube wall.

DESCRIPTION OF PREFERRED EMBODIMENTS

Figure 1:
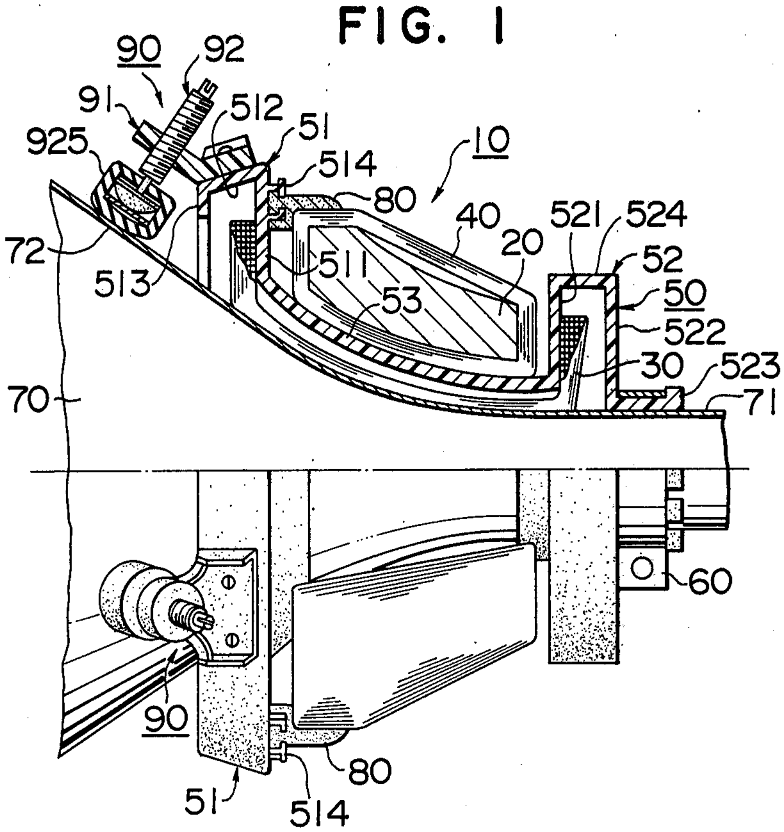
FIG. 1 is a side elevation of the deflection yoke of the invention as mounted on a cathode ray tube, with the upper half of the yoke being shown in vertical section.

FIG. 1 shows an embodiment of the invention as applied to a deflection yoke 10 of known configuration. The yoke 10 comprises an annular core 20, a flared horizontal deflection coil 30 of a saddle configuration, a vertical deflection coil 40 toroidally wound on the core 20, and a coil separator 50 formed of a resin material such as polypropylene and interposed between the coils 40, 30. The deflection yoke is supported on a neck 71 of a cathode ray tube 70 by a clamping band 60 which clamps the rear end 523 of the coil separator 50 against it. The coil separator 50 includes a flared portion 53 which extends along the flare of the tube, and the opposite ends of the flared portion are formed with front and rear recesses 51, 52, respectively, in which folded portions of the horizontal deflection coil 30 are received.

The recess 51 is defined by a radially extending wall 511 which joins with the front end of the flared portion 53, a peripheral wall 512 joined with the outer end of the wall 511 and extending toward a tube wall 72, and a flange 513 which extends radially inward from the forward end of the peripheral wall 512. The wall 511 is externally provided with a dovetail groove which is formed by a pair of projections 514 and which serves preventing an outflow and detachment from the wall 511 of an adhesive 80 that is utilized to secure the vertical deflection coil 40.

The other recess 52 is defined by a wall 521 which extends radially outward from the rear end of the flared portion 53, a radially extending wall 522 having a plurality of tongues 523 which are disposed to surround the neck 71 of the tube, and a peripheral wall 524 which joins the walls 521 and 522 together. A clamping band 60 is disposed around the tongues 523, and a screw (not shown) may be tightened to clamp the tongues against the neck 71, thereby fixing the rear end of the deflection yoke thereon.

In accordance with the invention, the yoke 10 is provided with a plurality of positioning units 90 which are disposed on the peripheral wall 512 of the coil separator 50 which defines the front recess 51. While only two of the positioning units are shown, it is preferable to provide three units which are spaced 120° from each other. Each positioning unit 90 comprises a support plate 91 secured to the peripheral wall 512, and a threaded bolt 92 which adjustably and threadably engages the support plate 91. The bolts 92 may be turned until their free end bears against the tube wall 72, thus adjusting the orientation of the deflection yoke 10 so that its axis is aligned with the axis of the tube.

Figure 2:
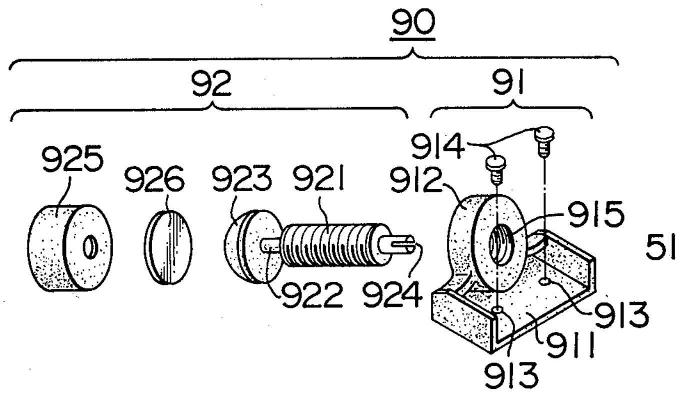
FIG. 2 is an exploded, perspective view of a positioning unit shown in FIG. 1.

FIG. 2 is an exploded perspective view of the positioning unit 90. The support plate 91 includes a base 911 and a boss 912. The base 911 is formed with openings 913 through which set screws 914 may be passed to fix the base on the peripheral wall 512 of the coil separator 50. The boss 912 assumes an angle of inclination with respect to the base 911 so that it lies in a plane parallel to the tube wall 72 when the base is fixed on the coil separator 50. A threaded bore 915 is formed extending through the boss in a direction toward the tube wall 72.

The adjusting bolt 92 includes a threaded body 921, one end of which is connected through a portion 922 of a reduced diameter with a spherical head 923 and the other end of which is formed with a groove 924 which is adapted to receive the tip of a screwdriver. The head 923 is nestingly received in a rubber cap 925 with a washer 926 interposed therebetween. The cap 925 is freely rotatable on the head 923.

Figure 3:
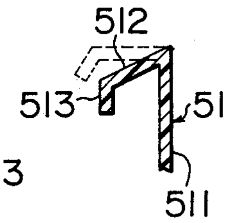
FIG. 3 is a cross section of part of the front end of a coil separator.

In use, when mounting the yoke 10 on the cathode ray tube 70, the size of the image field as well as the purity are initially adjusted. Then, the clamping band 60 is tightened to fix the rear end 523 of the yoke on the neck 71. Subsequently, the individual bolts 92 are turned until their caps 925 bear against the tube wall 72. By turning the bolts 92 in small angular increments relative to each other, the orientation of the front end of the deflection yoke is adjusted so that an optimum convergence is obtained. Subsequent to the adjustment, the peripheral wall 512 of the coil separator will be subject to a reaction of the tube wall 72. In order to minimize the influence of this reaction, it is preferred that a slant is formed in the peripheral wall 512 as shown in solid line in FIG. 3 where dotted lines illustrate the configuration of a conventional wall.

Figure 4:
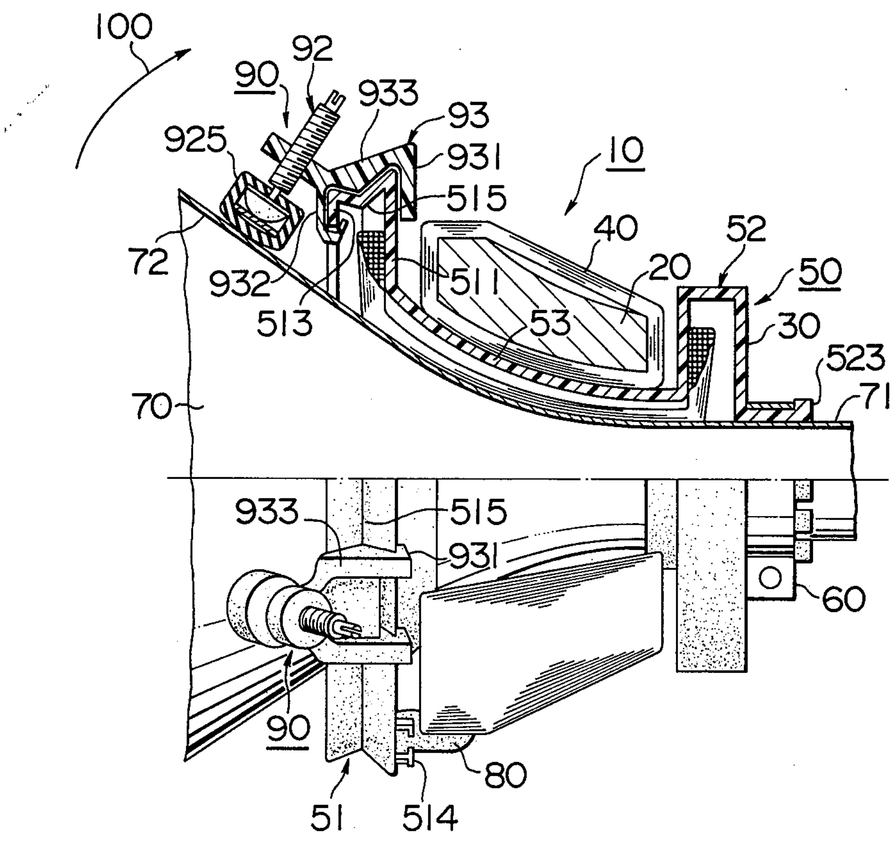
FIG. 4 is a similar view to FIG. 1, showing another embodiment of the invention.

FIG. 4 shows another embodiment wherein instead of the support plate 91 (FIG. 1) providing a threadable engagement with the coil separator 50, the positioning unit 90 includes a hooked support plate 93, which comprises a limb 9 bearing against the wall 511, and a pawl 932 engageable with the flange 513 of the coil separator 50. To facilitate engagement, the pawl 932 is preferably made resilient. In order to secure the positioning unit 90 in position, the front recess 51 is defined in part by a V-shaped peripheral wall 515, in which is fitted a correspondingly shaped bottom of a base 933 of the hook plate 93. The adjusting bolt 92 has a similar construction as mentioned above in connection with FIG. 1. In use, the pawl 932 is engaged with the flange 513 and the plate 93 turned in a direction of arrow 100 so as to straddle the walls 515 and 511, whereupon the positioning unit 90 can be mounted in place. It may be easily dismounted by turning the plate 93 in the opposite direction. When mounted on the cathode ray tube 70, the unit 90 is urged in the direction of the arrow 100 by reaction of the tube wall 72, thus avoiding unintended removal thereof.

While particular embodiments of the invention have been shown and described, it should be understood that numerous changes and modifications will readily occur to those skilled in the art. For example, the flange 513 may be eliminated where the peripheral flange 512 has a sufficient strength. Other parts of the coil separator 50 may be changed in a similar manner. Four of positioning units 90 may be provided. The vertical deflection coil 40 may be of a saddle configuration rather than a toroidal winding. The support plate 91 may be adhesively secured to the periphery of the coil separator 50 instead of utilizing a set screw as shown in FIG. 1. Alternatively, the coil separator 50 may be previously formed with a slot in which to fit the base 911 of the support plate 91.

Having described the invention, what is claimed is:

1. In a deflection yoke comprising an annular core, a horizontal deflection coil of a saddle configuration, a vertical deflection coil having a conductor extending along the inside of the core, a coil separator interposed between the both coils having a recess in its front end and having a plurality of tongues at its rear end, the recess being defined by a radially outwardly extending wall and a peripheral wall, the tongues being adapted to be disposed around the neck of a cathode ray tube, and a clamping band for clamping the tongues against the neck; the improvement which comprises at least three positioning units disposed adjacent to the front end of the coil separator at substantially uniform spacing around the periphery thereof, each of the positioning units comprising a support plate having a threaded bore which extends toward the tube wall and an adjusting bolt means having a threaded portion threadably engaging the threaded bore and a head portion directly contacting the tube, the bolt means being turned into contact with the tube wall to thereby support a front portion of the deflection yoke.

2. A deflection yoke according to claim 1 in which the peripheral wall has a slant formed in it so as to extend toward the tube wall.

3. A deflection yoke according to claim 1 wherein the head portion of the bolt means comprises a semi-spherical head, a washer and a cap surrounding the washer and head.

4. A deflection yoke according to claim 1 in which the support plate comprises a boss and a base carrying the boss, the base being secured to a wall of the recess.

5. A deflection yoke according to claim 4 in which the base is secured to the peripheral wall by screw means.

6. A deflection yoke according to claim 4 in which the base includes a pawl engageable with an edge of the recess and a limb bearing against the radial wall of the recess.

7. A deflection yoke according to claim 6 in which the edge of the recess is formed with a flange which is engaged by the pawl.

8. A deflection yoke according to claim 7 in which the peripheral wall is V-shaped in section, with the bottom of the base which engages the peripheral wall having a complementary configuration.

* * * * *